United States Patent [19]

Coss

[11] 4,451,577

[45] May 29, 1984

[54] CATALYST COMPOSITION AND METHOD FOR CURING FURAN-BASED FOUNDRY BINDERS

[75] Inventor: William W. Coss, Richmond, Ill.

[73] Assignee: The Quaker Oats Company, Chicago, Ill.

[21] Appl. No.: 261,319

[22] Filed: May 6, 1981

[51] Int. Cl.$^3$ .................. B01J 31/30; B01J 31/26; B01J 31/02; B22C 1/22

[52] U.S. Cl. .................. 502/167; 164/526; 164/527; 502/168; 502/169; 502/172; 523/144; 524/442

[58] Field of Search .................. 252/426, 428, 429 R, 252/431 R; 523/144; 524/442; 526/270; 502/167, 168, 169, 172

[56] References Cited

U.S. PATENT DOCUMENTS

| 3,247,556 | 4/1966 | Buell et al. | 523/144 |
| 3,487,043 | 12/1969 | Grudus, Jr. | 526/270 |
| 3,549,584 | 12/1970 | Sekera et al. | 523/144 |
| 4,215,012 | 7/1980 | Kho et al. | 524/442 |
| 4,371,649 | 2/1983 | Iglesias | 523/145 |

FOREIGN PATENT DOCUMENTS 44739 1/1982 European Pat. Off. ............ 164/526

OTHER PUBLICATIONS

Chem. Abs., vol. 95, No. 22 (Nov. 30, 1981), 191118.
Iglesias, H. E., Spain, Patent No. 493,602, 2/16/81.

Primary Examiner—P. E. Konopka
Attorney, Agent, or Firm—Karen E. Ayd

[57] ABSTRACT

A catalyst composition and a foundry method for the rapid production of cured, high tensile strength foundry sand shapes from a foundry mixture containing a furan-based binder and polyvinyl alcohol are disclosed. The polyvinyl alcohol is incorporated into a special thermally-activated strong acid salt catalyst prior to admixture of the catalyst composition with the sand and a furan-based binder. The sand-binder-catalyst composition is then shaped and the sand shapes are heated, resulting in exceptionally high tensile strengths in short times. In foundry methods involving in situ heating of the sand shape within the pattern, clean release (without sticking) from the pattern after cure is achieved.

4 Claims, No Drawings

CATALYST COMPOSITION AND METHOD FOR CURING FURAN-BASED FOUNDRY BINDERS

BACKGROUND OF THE INVENTION

Polyvinyl alcohol, hereinafter referred to as "PVA", is a water soluble synthetic polymer made by the alcoholysis of polyvinyl acetate. The properties of PVA depend to a large extent on the degree of polymerization and the percentage of alcoholysis, both of which are controllable by processing. Water solubility of the PVA increases as the molecular weight decreases. PVA decomposes at 200° C. PVA is well known for use as a surface coating, a laminating adhesive, a binder for fabrics and papers, a molding compound for use in the plastics industry, and an emulsifier (for use, for example, as an emulsifier for furfuryl alcohol polymers).

U.S. Pat. No. 3,487,043 issued to T. M. Grudus, Jr., discloses a composition containing an in situ polymerized liquid furan resin, an insoluble inert filler, acid catalyst, and a silane, for use in improved flexural strength reinforced furan resin compositions. In Column 2, lines 47 through 50, the Grudus patent indicates that a liquid furan resin for use in accordance with the Grudus invention can include furan resins in admixture with other resins, for example in mixture with partially hydrolyzed polyvinyl acetate. The specification of the Grudus patent further indicates (in Column 3, lines 65 through 70) that the composition may be cured at conventional curing times and temperatures, e.g. 24 hours at 70° C. No where in the Grudus patent is there any indication that the composition is suitable for use in the foundry and in particular, no mention is made of an improved foundry method in which a catalyst composition containing PVA is employed to rapidly cure (i.e. in less than five minutes) furan resins to yield a high tensile strength foundry sand shape.

Of major concern in the foundry industry is the rapid production of high quality molds and cores at the lowest feasible cost. Foundries which employ traditional tower oven heating, e.g. of core oil bound shapes, and also those using hot and warm box methods, are adversely affected economically by increased energy costs. In addition, slowdown and low quality product cause an increase in foundry costs. Slowdown can result from many factors including slow cure rates or long pattern dwell times. Low quality or unuseable cores and molds can result when the sand shape overcures in the pattern or does not cleanly release from the heated surface of the pattern in which it is cured. When the operator attempts to remove a sand shape which is sticking to the pattern, destruction of the shape can result. Theoretically, systems which employ the lowest temperature cure, the least amount of energy, the highest production rate (i.e. shorter dwell times and fewer unuseable cores or molds) are favored. As a practical matter some energy is required to at least begin the curing processes at a reasonably fast industrial curing rate.

Furan-based binders are desirable in foundry practice, particularly for use in core production, because, after pouring of the molten metal over the core or mold, sand shapes employing furan-based binders rapidly deteriorate, resulting in easy "shake-out". This desirable shake-out characteristic results because of the rapid heat degradation of the binder. However, if the heat degradation is too rapid the binder may overcure in situ in the heated pattern, resulting in poor tensile strength.

It is highly desirable to provide curable foundry binder systems which are exothermic and which are triggered by relatively low levels of heat input, to achieve advanced cures in short times. Thus, the foundry industry is in need of a method for rapidly producing foundry cores and molds which are of high quality (e.g. high tensile strengths, low overcure and clean pattern release to prevent breakage) and which can be cured quickly with the least expenditure of energy.

An object of this invention is to provide a method for producing foundry sand shapes wherein the foundry sand shapes are produced from mixes having workable bench lives but which are cured rapidly (i.e. in less than five minutes, and in preferred embodiments in less than two minutes) with minimal energy input.

Another object of this invention is to provide a foundry catalyst composition for use in the method of this invention, in which the composition can be employed to cure furan-based binders to provide for rapid production of high tensile strength sand shapes.

A further object of this invention is to provide a foundry composition which has a working life of one hour or more, which can be rapidly cured by heat-activating the composition, and which produces sand shapes having high tensile strength when cured.

Another object of this invention is to provide a foundry composition which has a relatively slow "overcure" rate, but which has desirable "shake-out" characteristics.

A still further object of this invention is to rapidly produce foundry sand shapes by conventional means of minimal heating (e.g. heating in either a heated pattern for less than two minutes or in a microwave oven for less than five minutes), wherein the exothermic curing is triggered by low superambient temperatures.

As a further object, this invention provides a foundry method in which the foundry composition is rapidly cured (e.g. in less than two minutes) by heating within a heated pattern to form a foundry sand shape which will cleanly and easily release from the shaping pattern.

SUMMARY OF THE INVENTION

These and other objects are achieved by the catalyst composition and method of the present invention wherein a foundry mixture comprising foundry sand, a furan-based binder, and a catalyst composition containing a salt of a strong acid and a polyvinyl alcohol, is cured in less than five minutes by heat-activating the composition. The heat activation of the foundry mixture to achieve a cure can, for example, utilize placement of the composition either (a) in contact with the surface of a heated pattern, of (b) in a pattern which is, in turn, placed in a microwave oven, or (c) after shaping, as a free-standing sand shape, in a microwave oven. The method provides for heating the shaped foundry composition for less than five minutes in microwave oven methods, and for less than two minutes (and most preferably for less than 60 seconds) in hot and warm box processes.

The polyvinyl alcohols preferred for use in accordance with the method of the present invention are those water dispersible polyvinyl alcohol compositions (derived from hydrolyzing polyvinyl acetate) which provide a viscosity in the range of 1 to 6 cps at 4 percent solids at 20° C., and which have an approximate molecular weight average between 2,000 and 15,000. The most preferred molecular weight average is between 2,000 and 10,000. In addition, it is preferable that the polyvinyl alcohol be essentially neutral and exhibit little or no change upon storage, even at elevated temperatures. A most preferred polyvinyl alcohol for use in accordance with the present invention is a polyvinyl alcohol which has a viscosity between 1.8 to 6 cps, and which has a molecular weight average no greater than 10,000.

Commercially available polyvinyl alcohol compositions eminently suitable for use as ingredients in accordance with the present invention, include, but are not limited to, Gelvatol 40-10 and 40-20 (T.M. Monsanto Chemicals); and low viscosity Elvanol polyvinyl alcohols (T.M. E. I. Dupont NeMours & Co.).

The polyvinyl alcohol addition to the foundry composition for use in accordance with the present invention, can be provided by initial admixture of the PVA with the strong acid salt ingredient prior to the admixing of the catalyst-PVA composition with the sand. Typically, the catalyst ingredient is admixed with the sand before the uncatalyzed binder ingredient is added to the sand.

The catalyst composition containing PVA is relatively stable, and is capable of being stored as a mixture for long periods of time (e.g. at least twelve months).

For use in accordance with the present invention, the PVA is preferably diluted with water to ease the admixture of the PVA with the strong acid salt to form the catalyst composition. The dilution preferably is in the range 30 to 40 weight percent PVA in water. The most preferred PVA to water ratio is 35 weight percent PVA in water. However, commercially available ground, solid PVA can also be admixed with and dissolved in the catalyst. In order to facilitate the blending of the ground, solid PVA with the salt of an acid, the mixture is warmed to a temperature of approximately 60° C.

The furan-based binders suitable for use in accordance with the present invention include those furan-based binders which are liquid. Exemplary furan-based binders include those binders which are the product of the homopolymerization of furfuryl alcohol with itself or of the homopolymerization bis-hydroxymethylfuran with itself. Other exemplary binders suitable for use in accordance with the present invention include the polymerization products of furfuryl alcohol and/or bis-hydroxymethyl furan with formaldehyde, or with a urea-formaldehyde blend. In addition, those furan-based binders which are a liquid mixture of monomeric furfuryl alcohol with a urea-formaldehyde resin, and/or a phenolic resin, and/or bis-hydroxymethyl furan resin are eminently suitable. A preferred furan-based binder for use in accordance with the present invention, is resinous high bis-hydroxymethyl furan condensation product of furfuryl alcohol and formaldehyde. By "resinous high bis-hydroxymethylfuran condensation products" is meant those products in which the majority (over 70%) of the molecular moieties are polyhydroxymethylated which product has little or no di-furfuryl ether or a di-furfuryl methane homolog. Another preferred furan-based binder for use in accordance with the present invention is a blend of a resinous high polyhydroxymethyl furan condensation product and furfuryl alcohol monomer. Yet another preferred binder is monomeric furfuryl alcohol modified with a urea-formaldehyde resin and a novolak resin.

The catalysts suitable for use in the catalyst composition employed in the method of the present invention include (a) salts of strong acids which are of the type of salts commonly employed in furan binder-containing hot box foundry methods, and (b) salts or pseudo-salts of certain strong organic acids. The strong acid salts which are commonly employed in furan binder containing hot box foundry methods are those salts which have sufficient latentcy to provide an adequate working life of the composition (e.g. a working life of at least one hour at 70° C.) and which rapidly accelerate the cure of the composition under heated conditions, e.g. at temperatures greater than 150° F., in less than five minutes. Such hot box catalysts suitable for use in accordance with the present invention include for example, ammonium chloride, ammonium sulfate, ammonium nitrate, aluminum chloride, aluminum nitrate, aluminum sulfate, copper chloride, copper nitrate, and copper sulfate. The catalysts suitable for use in the catalyst composition also include salts or pseudo-salts, namely aluminum, copper, iron and urea salts of certain strong organic acids. These organic acid salts are those salts made from a weak base and strong organic acid selected from the group comprising lower aliphatic-substituted and aromatic-substituted sulfonic acids, such as, for example, toluene sulfonic acid, benzene sulfonic acid, xylene sulfonic acid, and methane sulfonic acid. Such salts include, among others—aluminum methane sulfonate, aluminum toluene sulfontte, aluminum xylene sulfonate, aluminum phenol sulfonate, copper toluene sulfonate, copper xylene sulfonate, copper phenol sulfonate, copper methane sulfonate, urea-phenol sulfonate, urea-toluene sulfonate, urea-methane sulfonate, urea-xylene sulfonate, iron phenol sulfonate, iron toluene sulfonate, iron xylene sulfonate, iron methane sulfonate.

A liquid catalyst composition is preferred in order to facilitate the adequate mixing of the catalyst on the sand. Therefore the salt is generally completely dissolved in water and the solution is admixed with PVA and then added as the catalyst composition on the sand.

A foundry composition for use in accordance with the method of the present invention includes sand, 0.7 to 2 percent of a furan-based binder (based on the weight of the sand), 5 to 25 percent (based on the weight of the binder) of a salt of a strong acid in sufficient water to dissolve the salt, 1 to 5 percent (based on the weight of the binder) of a polyvinyl alcohol. More preferably 2 to 4 percent (based on the weight of the binder) of the composition is a polyvinyl alchol. The most preferred composition includes 1.4 to 1.6 percent furan-based binder (based on the weight of the sand), 2 to 4 percent of a PVA (based on the weight of the binder) 15 to 25 percent (based on the weight of the binder) of a salt of an acid (in water solution), and 0.15 to 0.40 percent silane (based on the weight of the binder).

A storage-stable PVA-catalyst mixture is preferably pre-prepared by admixing a 35 to 45 percent salt, 45 to 60 percent water and 5 to 10 percent polyvinyl alcohol based on the total mixture of salt-water-PVA.

The method of the present invention provides for a heat-activated cure of the binder-catalyst-polyvinyl alcohol foundry composition. The foundry composition may be heat-activated by conventional methods for heat hardening of foundry binders, includng hot and warm box processes involving the contacting of the composition with a heated pattern having a temperature, for warm box processes between approximately 250° F. and 350° F., and for hot box processes between 350° F. and 550° F. As an alternative, the composition may be cured by heat activation, either in the pattern or as a free-standing sand shape, (e.g. by microwave heating) to temperatures greater than 150° F. in a microwave oven. In the microwave oven the heat-activation occurs within the sand shape itself by the agitation by microwaves of the susceptible polar molecules, (e.g. water) in the binder-catalyst-PVA composition. The sand is only incidentally heated by the heat generated in the composition. In accordance with the present invention the foundry composition is heat activated to trigger cure and to harden the exterior surfaces of the sand shape to make the shape handleable. The amount of time necessary for triggering the cure and hardening the sand shape in microwave methods is less than five minutes, preferably less than two minutes. In the hot box and warm box methods the sand shape hardens and the cure is triggered more quickly, e.g. in less than two minutes and in preferably less than 60 seconds. After heating, the hardened sand shape is removed from contact with the heat-activation source, and in preferred embodiments permitted to fully cure for 15 minutes to one-half hour, most preferably to one hour, before pouring of the molten metal.

The addition of polyvinyl alcohol to the foundry composition for use in accordance with the hot box and warm box methods of the present invention, provides for clean release of the cured foundry shape from the heated pattern, without the sticking problems heretofore experienced.

EXAMPLE I

The purpose of this example is to illustrate the effect on tensile strengths of foundry sand shapes when PVA is added to the catalyst used to cure the sand shapes.

A bis-hydroxymethylfuran resin was prepared by heating to reflux (approximately 107° C.) 26.16 parts of paraformaldehyde (approximately 91 percent formaldehyde), 62.21 parts of furfuryl alcohol, 9.09 parts water and 2.49 parts of acetic acid in a reactor set up for reflux. The reaction mixture was allowed to react under reflux conditions for approximately 8 to 9 hours or until the product had a viscosity of 70 cps at 25° C. The resulting reaction mixture was stripped of the volatiles (excess formaldehyde, acetic acid, and water) by distilling under vacuum.

The binder employed in both tests 1-1 and 1-2 was a blend of 60 parts of bis-hydroxymethylfuran resin and a sufficient amount of furfuryl alcohol to yield a mixture of 60 percent bis-hydroxymethylfuran to 40 percent furfuryl alcohol. (Some unreacted furfuryl alcohol remains in the resin product and thus the additional amount of furfuryl alcohol necessary varies from product to product.)

The urea phenol sulfonate catalyst solution employed in test 1-1 contains polyvinyl alcohol (in accordance with the present invention), and was prepared by admixing 28.61 parts of PVA-35 (i.e. 35 percent solution of Gelvatol 40-20 (T.M. Monsanto) in deionized water), 61.11 parts of phenol sulfonic acid solution (i.e. a 65 percent solution in water), and 10.28 parts of urea. The catalyst employed in test 1-2 contains no PVA, and was prepared by admixing 28.61 parts of water, 61.11 parts of phenol sulfonic acid (65 percent solution in water), and 10.28 parts of urea. Test 1-2 is not in accordance with the present invention, and is provided for comparison purposes only, except that, in order to keep catalyst concentrations the same, water is added to test 1-2 in an additional amount corresponding to the amount of PVA added in test 2-1).

In each test, respective sand-catalyst mixes were prepared by first admixing 3000 parts of Wedron 5025 silica sand, and 6 parts of the respective catalyst solution. Secondly, after thorough admixing of catalyst on the sand, 30 parts of binder was added to each respective sand-catalyst mix.

The respective sand-catalyst-binder mixtures which resulted, were then charged separately into respective heated multiple mold pattern assemblies to produce dog-biscuit shaped tensile specimen biscuits. The respective patterns were heated to a temperature of 250° F. After remaining in contact with the heated pattern for a time period specified in Table I the hardened sand shapes were discharged from the pattern. In test 1-1, the sand shapes cleanly released from the pattern, whereas the shapes produced in test 1-2 were sticky, making removal from the pattern, without breakage, difficult. Cold tensile strengths were determined 30 minutes after removal. The results are listed in Table I.

TABLE I

Effect of PVA Additive in the Catalyst Composition

| Test | PVA-35[b] (parts) | Dwell Times (Sec.) at 250° F. Tensile Strength (psi) | | | |
|---|---|---|---|---|---|
| | | 10 | 20 | 30 | 45 |
| 1-1 | 1.72 | 400 | 495 | 615 | 560 |
| 1-2 | 0[a] | 305 | 405 | 420 | 375 |

[a]Not in accordance with the present invention, provided for comparison purposes only.
[b]PVA-35 (35% solution Gelvatol 40-20 (T.M. Monsanto) PVA in deionized water); Parts of PVA-35 in 6 parts catalyst.

EXAMPLE II

This example illustrates the effect of the addition of PVA to a catalyst used to cure a furan-based binder containing a novolak resin, when the binder is employed in sand shapes and cured in a microwave oven, in accordance with the method of the invention.

A foundry binder is prepared by admixing 70 parts furfuryl alcohol, 20 parts of a commercially available urea-formaldehyde syrup (Aerotex 581, containing an approximately 2:1 ratio formaldehyde to urea; T.M. American Cyanamid Corporation) and 10 parts of Plenco 1617 novolak resin (T.M. Plenco Plastics Engineering Co.). The admixture was warmed to approximately 60° C. and stirred to facilitate thorough blending and then cooled.

In test 2-1, 18 parts of an aluminum phenol sulfonate catalyst (prepared by admixing 42 parts of aluminum phenol sulfonte in 58 parts water) were admixed with 3000 parts Wedron 5025 silica sand. Then 45 parts of foundry binder was admixed thoroughly with the catalyst-sand mixture.

In test 2-2 (in accordance with the present invention) 18 parts of an aluminum phenol sulfonate catalyst containing PVA (prepared by admixing 42 parts aluminum phenol sulfonate, 8 parts Gelvatol 40-20 PVA (as solids) (T.M. Monsanto) and 50 parts of water) was admixed with 3000 parts Wedron silica sand. To this mixture a 45 part aliquot of the foundry binder was added.

Each sand-binder-catalyst mix was charged into a respective multiple-mold dog biscuit pattern assembly. The sand shapes were released from the pattern while at ambient room temperature, placed as free-standing shapes in a microwave oven and then cured at 1.8 kilowatt power for two minutes.

Upon removal from the microwave oven the dog biscuit sand shapes were permitted to stand at ambient room temperature conditions for 30 minutes, at which time six specimens of each were tested for tensile strengths. The tensile strengths listed on Table III under the heading "30 minutes" are the average of the six specimens prepared from and tested from each respective sand-binder-catalyst mix. Six more tensile strength biscuits of each sand-binder-catalyst mix were tested after standing overnight, and the results are listed under the heading "overnight" on Table II.

TABLE II

| Test | Catalyst$^a$ (%) | Binder$^b$ (%) | Tensile Strength (psi) 30 Mins. | Overnight |
|---|---|---|---|---|
| 2-1$^c$ | 40 | 1.5 | 490 | 335 |
| 2-2$^d$ | 40$^e$ | 1.5 | 640 | 450 |

$^a$Catalyst based on weight of the binder
$^b$Binder based on weight of the sand
$^c$Not in accordance with the present invention
$^d$Test 2-2 is in accordance with the invention
$^e$Catalyst contains 8% PVA and test 3-2 is in accordance with the present invention.

EXAMPLE III

This example also illustrates a microwave oven accelerated cure of the sand shape employing a commercially available furan-based binder and a catalyst containing PVA, in comparison with the cure of a sand shape with a catalyst containing no PVA.

The binder employed in both test 3-1 and test 3-2 is a binder containing furfuryl alcohol, urea, and formaldehyde, commercially available under the name Delta 344-8 (T.M. Delta Oil Products, Inc.).

The catalyst employed in test 3-1 was a 42 percent solution of aluminum phenol sulfonate in water. The catalyst employed in test 3-2 contains PVA, and thus test 3-2 is in accordance with the present invention. The catalyst employed in test 3-2 was prepared by admixing 42 parts aluminum phenol sulfonate, 8 parts Gelvatol 40-20 PVA (as solids) (T.M. Monsanto) and 50 parts water.

The sand-binder-catalyst mix in each test was prepared as follows:

A respective sand-catalyst mix was prepared by admixing a respective 3000 part batch of Fairwater F-130 silica sand (AFS grain fineness (50-60) with 3.9 parts of each respective catalyst. Then, 39 parts of binder was added to each respective sand-catalyst mix and the admixtures were thoroughly blended by mulling.

Each respective sand-catalyst-binder mix was charged into a multiple mold dog biscuit speciment mold, and the resulting sand shapes were cured in a microwave oven (1.8 kilowatt power). A batch of 6 sand shapes of each respective sand-binder-catalyst mix resided in the oven for 3 minutes, 4 minutes and 5 minutes each. The shapes were permitted to cool for 30 minutes after removal from the microwave oven prior to tensile strength testing. The average tensile strength of each 6 specimen batch of each mix is listed in Table III under the heading indicating the length of cure time in the oven.

TABLE III

| Test | Catalyst$^a$ (%) | Binder$^b$ (%) | Microwave Dwell 3 Mins. | 4 Mins. | 5 Mins. |
|---|---|---|---|---|---|
| 3-1 | 10 | 1.3 | 390 | 450 | 490 |

TABLE III-continued

| Test | Catalyst$^a$ (%) | Binder$^b$ (%) | Microwave Dwell 3 Mins. | 4 Mins. | 5 Mins. |
|---|---|---|---|---|---|
| 3-2$^c$ | 10$^d$ | 1.3 | 575 | 635 | 725 |

$^a$Catalyst based on the weight of the binder
$^b$Binder based on the weight of the sand
$^c$In accordance with the present invention
$^d$Catalyst contains 8% PVA

EXAMPLE IV

This example illustrates the effect of the addition of polyvinyl alcohol to a catalyst which is the aluminum salt of phenol sulfonic acid, for use in curing a furan binder containing a phenolic resin by warm box methods.

The binder employed in tests 4-1 and 4-2 was prepared by admixing 70 parts of furfuryl alcohol, 20 parts of "Aerotex 581" urea formaldehyde syrup having an approximately 2:1 ratio of formaldehyde to urea (T.M. of American Cyanamid Corporation), and 10 parts of Plenco 1617 novolak resin (T.M. Plenco Plastics Engineering Co.).

The catalyst employed in test 4-1 was prepared by admixing 42 parts of aluminum phenol sulfonate, 8 parts Gelvatol 40-20 polyvinyl alcohol (as solid) (T.M. Monsanto) and 50 parts of water and heating the admixture to approximately 60° C. to dissolve the polyvinyl alcohol in the admixture.

The catalyst employed in test 4-2 contains no polyvinyl alcohol and thus the test is not in accordance with the present invention. The catalyst of test 4-2 is a 42 percent solution of aluminum phenol sulfonate in water.

For each test a respective sand-binder-catalyst mix was prepared by admixing 4000 parts of beneficiated lake sand (product by Standard Sands of Grand Haven, Mich.) with 16.8 parts of a respective catalyst. After thorough admixing of the catalyst on the sand, 48 parts of binder is added to each respective sand-catalyst mix. (The bench life of each respective sand-catalyst-binder mix was in excess of 24 hours.) Each respective sand-catalyst-binder mix was then charged into a pattern heated to a temperature of 325° F. While the foundry composition employed in test 4-1 (in accordance with the present invention) resulted in specimen biscuits which were easily removed from the heated pattern surface, the specimen biscuits of test 4-2 were sticky, and difficult to release from the pattern. Tensile strengths were determined in accordance with the method described in Example I. The results of these tests are set forth on Table IV.

TABLE IV

| Test | Catalyst$^a$ (%) | Binder$^b$ (%) | Dwell Time (Sec.) at 325° F. Tensile Strengths (psi) 30 | 45 | 60 |
|---|---|---|---|---|---|
| 4-1 | 35 | 1.2 | 320 | 530 | 570 |
| 4-2$^c$ | 35$^d$ | 1.2 | 150 | 370 | 390 |

$^a$Based on the weight of the binder
$^b$Based on the weight of the sand
$^c$Not in accordance with the present invention
$^d$Contains no PVA

EXAMPLE V

This example illustrates the effect of the addition of polyvinyl alcohol to a copper toluene sulfonate salt catalyst when the catalyst is employed to cure a furan based binder containing a phenolic resin. The binder for tests 5-1 and 5-2 was prepared by admixing 70 parts of furfuryl alcohol, 15 parts of Plenco 1617 novolak resin (T.M. Plenco Plastics Engineering Co.), 15 parts of "Beetle 65" methylated-urea-formaldehyde resin (T.M. American Cyanamid Corporation).

The catalyst employed in test 5-1 contains polyvinyl alcohol and thus was employed in accordance with the method of the present invention. The catalyst in test 5-1 was prepared by admixing 38 parts of copper toluene sulfonate, 8 parts Gelvatol 40-20 polyvinyl alcohol (T.M. Monsanto) and 54 parts of water. The catalyst in test 5-2 contains no polyvinyl alcohol and thus test 5-2 is not in accordance with the present invention. The catalyst in test 5-2 was prepared by admixing 39 parts of copper toluene sulfonate and 61 parts of water.

A respective sand-catalyst mix for each test was prepared by admixing 3000 parts of beneficiated lake sand, 18 parts of each respective catalyst. After thorough mixing of each respective sand-catalyst mix, 45 parts of binder were added to each respective mix and thoroughly admixed therewith. Tensile strength specimen biscuits were prepared in a pattern heated to a temperature of 450° F., and were tested in accordance with the method described in Example I. The specimen biscuits of test 5-1 (containing PVA) cleanly released from the heated pattern, while the biscuits produced from the foundry composition containing no PVA were sticky and difficult to remove from the heated pattern.

TABLE V

| Test | Catalys$^a$ (%) | Binder$^b$ (%) | Dwell Times at 450° F. (Sec.) Tensile Strengths (psi) | |
|---|---|---|---|---|
| | | | 20 | 30 |
| 5-1 | 40 | 1.5 | 520 | 520 |
| 5-2$^c$ | 40$^d$ | 1.5 | 410 | 440 |

$^a$Based on the weight of the binder
$^b$Based on the weight of the sand
$^c$Not in accordance with the present invention
$^d$Contains no PVA

EXAMPLE VI

This example provides a comparison of two different polyvinyl alcohols for use in the foundry catalyst employed in accordance with the present invention.

The binder employed in tests 6-1 and 6-2 was prepared by the method described in Example I.

The catalyst employed in test 6-1 is an aluminum phenol sulfonate catalyst containing Gelvatol 40-20 polyvinyl alcohol (T.M. Monsanto Chemicals). The catalyst was prepared by admixing 42 parts aluminum phenol sulfonate salt, 8 parts Gelvatol 40-20 polyvinyl alcohol and 50 parts of water.

The catalyst employed in test 6-2 is an aluminum phenol sulfonate salt catalyst containing Gelvatol 20-30 polyvinyl alcohol (T.M. Monsanto Chemicals). The catalyst of test 6-2 was prepared by admixing 42 parts aluminum phenol sulfonate salt, 8 parts Gelvatol 20-30 polyvinyl alcohol, and 50 parts of water.

In each test a separate respective binder-sand-catalyst mix was prepared by the following method:

18 parts of each respective catalyst was thoroughly admixed with a respective 3000 part batch of Wedron 5025 silica sand. Then, 45 parts of foundry binder was admixed with each respective sand-catalyst mix. After thoroughly admixing the separate sand-binder-catalyst mixes, each mix was rammed into a respective multiple mold pattern heated to 450° F. and was allowed to remain in the pattern for the dwell times listed on Table VI. In each test 6 tensile strength specimens were tested immediately after removal from the heated pattern and the average of these results is listed on Table VI under the heading "hot strengths." In addition, six other tensile strength specimens were tested 30 minutes after removal from the heated pattern, and the average results of these 6 tests is listed on Table VI under the heading "cold strengths."

TABLE VI

| Test** | PVA* | Dwell Times (Sec.)/Hot Strengths (psi) | | Dwell Times (Sec.)/Cold Strengths (psi) | |
|---|---|---|---|---|---|
| | | 20 | 30 | 20 | 30 |
| 6-1 | Gelvatol 40-20 | 63 | 80 | 560 | 650 |
| 6-2 | Gelvatol 20-30 | 62 | 80 | 580 | 650 |

*Trade mark of Monsanto Chemicals
**Both tests are in accordance with the invention

EXAMPLE VII

This example illustrates that the addition of polyvinyl alcohol to the furan-based binder (not in accordance with the present invention) increases the tensile strengths after extremely short dwell times, but decreases strengths of sand shapes cured for longer dwell times.

The binder employed in both test 7-1 and 7-2 was a 40/60 blend of furfuryl alcohol and bis-hydroxymethyl furan resin (prepared in accordance with the method described in Example I).

In test 7-1, a foundry binder was prepared by admixing 60 parts of the bis-hydroxymethyl furan resin and a sufficient amount of furfuryl alcohol to yield a mixture 60 percent bis-hydroxymethyl furan resin to 40 percent furfuryl alcohol. (Some unreacted furfuryl alcohol remains in the resin product and thus the additional amount of furfuryl alcohol necessary will vary slightly.) This provides 100 parts of binder. A-1160 Ureido silane (T. M. Union Carbide Chemicals) 0.30 parts is added to the binder mixture.

The binder of test 7-2 was prepared by admixing 60 parts of the bis-hydroxymethyl furan resin, 34 parts of furfuryl alcohol, 6 parts PVA-35 (35 percent solution of Gelvatol 40-20 (T. M. Monsanto) in deionized water), and 0.30 parts of A-1160 Ureido silane (T. M. Union Carbide Chemicals).

In each test, a foundry sand-binder-catalyst mix was prepared by first admixing by mulling 3000 parts of Wedron 5025 silica sand, and 6 parts of a urea-phenol sulfonate salt catalyst solution prepared by admixing 57 parts of phenol sulfonic acid (65 percent solution in water), 13 parts of urea, and 30 parts of deionized water. (The catalyst composition contains no PVA and thus the tests are not in accordance with the present invention.) After the catalyst was thoroughly admixed on each respective batch of sand, 30 parts of each respective binder was admixed with a respective sand-catalyst mix. The resulting respective sand-binder-catalyst mixes were separately mixed and then charged separately into respective heated multiple mold pattern assemblies to produce dog-biscuit shaped tensile specimen biscuits. The respective patterns were heated to a temperature of 250° F. This corresponds to "warm box" practice. After remaining in contact with the heated pattern surface for the dwell time periods specified in Table VII, the hardened sand shapes were discharged from the pattern and one-half hour after discharge the tensile strengths were tested. In all tests, the hardened sand shapes were sticky and difficult to release from the pattern. The results of these cold tensile tests (an average of 6 specimens) are listed on Table VII.

TABLE VII

Effect of PVA Additive in the Binder

| Test | PVA-35* in 30 parts Binder (parts) | Dwell Times (Sec.) at 250° F. Tensile Strength (psi) | | | |
|---|---|---|---|---|---|
| | | 10 | 20 | 30 | 45 |
| 7-1 (not in accordance with present invention) | 0 | 290 | 450 | 485 | 450 |
| 7-2 (not in accordance with invention) | 1.8 | 430 | 465 | 405 | 320 |

*PVA-35 - (35 percent solution of Gelvatol 40-20 (T.M. Monsanto in deionized water.) The only difference between the preparation procedure is the presence or absence of PVA.

A comparison of the differences in results obtained in Example I and VII shows that adding the polyvinyl alcohol to the catalyst in accordance with this invention, gives an unexpected improvement across the range of dwell times, whereas adding the PVA to the binder and not the catalyst gives an unexpected improved result for only the initial 10 second dwell time, and thereafter gave the same or poorer tensile strengths. Decreasing tensile strengths are the result of "overcuring" of the furan-based binder. The results of these tests indicate that the PVA addition to the catalyst slows the rate of overcure.

I claim:

1. A catalyst composition comprising:
   a. at least one salt of a strong acid in solution and,
   b. at least one water dispersible polyvinyl alcohol having a viscosity between 1 and 6 centipoise inclusive at 4 percent solids at 20° C. and having a molecular weight average between about 2,000 and 10,000.

2. The catalyst composition of claim 1 wherein the salt is selected from the group consisting of:
   aluminum methane sulfonate, aluminum toluene sulfonate, aluminum xylene sulfonate, aluminum phenol sulfonate, copper toluene sulfonate, copper xylene sulfonate, copper phenol sulfonate, copper methane sulfonate, urea-phenol sulfonate, urea-toluene sulfonate, urea-methane sulfonate, urea-xylene sulfonate, iron phenol sulfonate, iron toluene sulfonate, iron xylene sulfonate, iron methane sulfonate, ammonium chloride, ammonium sulfate, ammonium nitrate, aluminum chloride, aluminum nitrate, aluminum sulfate, copper chloride, copper nitrate and copper sulfate.

3. A storage stable catalyst composition comprising:
   a. 35 to 45 percent, inclusive, of at least one salt of a strong acid,
   b. 45 to 60 percent, inclusive, water; and
   c. 5 to 10 percent of at least one water dispersible polyvinyl alcohol having a viscosity between 1 and 6 centipoise, inclusive, at 4 percent solids at 20° C. and having a molecular weight average between about 2,000 and 10,000.

wherein all percents are based on the weight of the catalyst composition.

4. The catalyst composition of claim 3 wherein the salt of a strong acid is selected from the group of salts consisting of:
   aluminum methane sulfonate, aluminum toluene sulfonate, aluminum xylene sulfonate, aluminum phenol sulfonate, copper toluene sulfonate, copper xylene sulfonate, copper phenol sulfonate, copper methane sulfonate, urea-phenol sulfonate, urea-toluene sulfonate, urea-methane sulfonate, urea-xylene sulfonate, iron phenol sulfonate, iron toluene sulfonate, iron xylene sulfonate, iron methane sulfonate, ammonium chloride, ammonium sulfate, ammonium nitrate, aluminum chloride, aluminum nitrate, aluminum sulfate, copper chloride, copper nitrate and copper sulfate.

* * * * *